(12) United States Patent
Seethaler et al.

(10) Patent No.: US 8,633,673 B2
(45) Date of Patent: Jan. 21, 2014

(54) BATTERY CHARGING SYSTEM FOR NOTEBOOK COMPUTER

(75) Inventors: Kenneth Scott Seethaler, Wake Forest, NC (US); Larry Glenn Estes, Durham, NC (US); Jeremy Robert Carlson, Cary, NC (US); Bouziane Yebka, Apex, NC (US); Joseph Anthony Holung, Wake Forest, NC (US); Hiromitsu Yamaguchi, Kanagawa (JP); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 374 days.

(21) Appl. No.: 13/073,664

(22) Filed: Mar. 28, 2011

(65) Prior Publication Data
US 2012/0249053 A1 Oct. 4, 2012

(51) Int. Cl.
*H02J 7/00* (2006.01)
(52) U.S. Cl.
USPC .......................................... 320/107; 320/150

(58) Field of Classification Search
USPC .......................................................... 320/107
See application file for complete search history.

(56) References Cited

U.S. PATENT DOCUMENTS

| | | | | |
|---|---|---|---|---|
| 5,813,374 A | * | 9/1998 | Chasteen | 123/73 C |
| 6,697,645 B1 | * | 2/2004 | MacFarlane | 455/566 |
| 7,627,696 B2 | * | 12/2009 | Suematsu et al. | 710/14 |
| 7,772,850 B2 | * | 8/2010 | Bertness | 324/426 |
| 2001/0009362 A1 | * | 7/2001 | Sakakibara | 320/150 |
| 2002/0005709 A1 | * | 1/2002 | Nagai et al. | 320/150 |

\* cited by examiner

*Primary Examiner* — Arun Williams
(74) *Attorney, Agent, or Firm* — Schwegman Lundberg & Woessner, P.A.

(57) ABSTRACT

The apparatus includes an AC adapter input, a battery charger coupled to the input to charge a battery, a temperature sensor, and system logic to execute code stored on storage devices. The battery charger provides a charging current that is a function of temperature sensed by the temperature sensor. The charging current may also be a function of sensed barometric pressure, battery age, external temperature, a full charge capacity, and system power demand.

19 Claims, 3 Drawing Sheets

BATTERY CHARGING SYSTEM FOR NOTEBOOK COMPUTER

BACKGROUND

Many notebook computers typically take two to three hours to fully charge. Newer batteries may accept higher charging current, allowing them to be charged faster. Charging at higher rates also results in undesirable heat generation.

SUMMARY

An apparatus includes an AC adapter input, a battery charger coupled to the input to charge a battery, a temperature sensor, and system logic to execute code stored on storage devices. The battery charger provides a charging current that is a function of temperature sensed by the temperature sensor.

An apparatus includes an AC adapter input, a battery charger coupled to the input to charge a battery, a battery, a temperature sensor, an altimeter to sense barometric pressure in the notebook computer, and system logic to execute code stored on storage devices. The battery charger provides a charging current that is a function of temperature sensed by the temperature sensor and is a function of the sensed barometric pressure.

A method includes detecting a temperature of an apparatus, detecting a barometric pressure of the notebook computer, and charging an apparatus battery with a charging current selected as a function of the detected temperature and barometric pressure of the notebook computer.

In further embodiments, the charging current may also be a function of sensed barometric pressure, battery age, external temperature, a full charge capacity, and system power demand.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
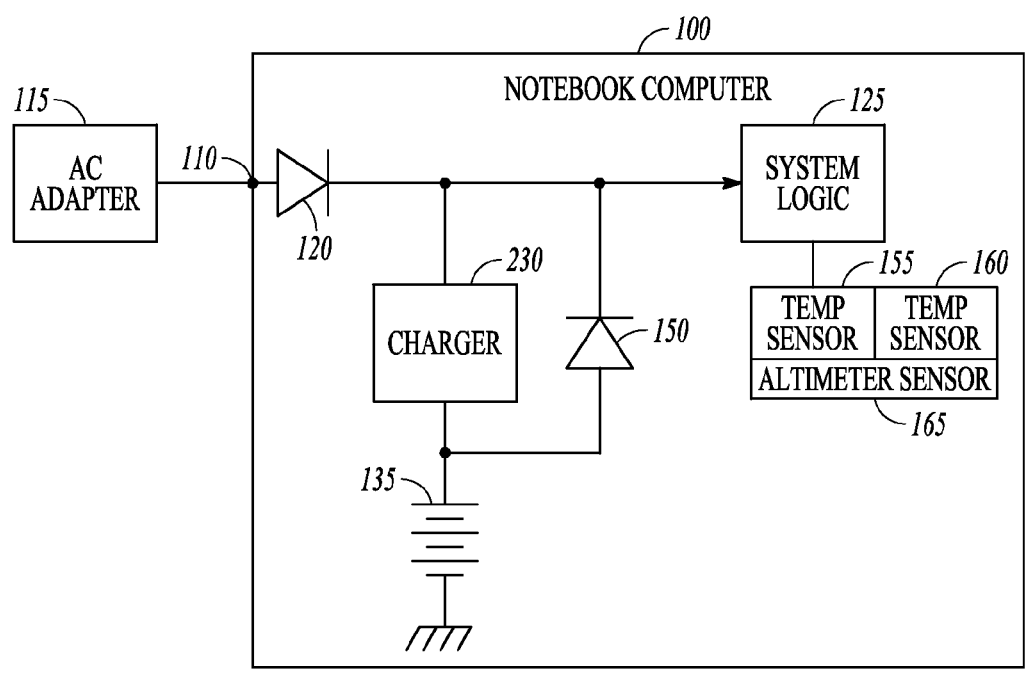
FIG. 1 is a block schematic diagram of notebook computer having a battery charge current dependent on at least temperature according to an example embodiment.

FIG. 1 is a block diagram of an apparatus such as a notebook computer 100. The notebook computer 100 has a power input 110 to couple to an AC adapter 115 or other power source that provides a suitable DC power source for the notebook. The power input 110 is coupled to a current direction control device such as a diode 120 to ensure current flows in one direction. Note that the term, diode, is meant to include a field effect transistor (FET) configured to behave as a diode with respect to current flow. An FET includes a parasitic diode (body diode) and a switch that are connected in parallel. When FET is off state (switch is off), it works as a diode. In some embodiments, FETs may be used to control current flow in all locations since FET exhibits low power losses. The adapter 115 provides power via the power input 110 and diode 120 for system logic 125 that executes programming to provide applications for users, as well as powering a monitor and other user interface devices.

Diode 120 is also coupled to a charging circuit 130 that provides current to charge a main battery 135. Main battery 135 and charging circuit 130 are usually integrated within an enclosure or within the confines of a thin rectangular form factor common with notebook computers.

A second diode 150 in notebook computer 100 is used to provide current to the system logic 125 when the notebook computer 100 is running off of battery power.

In various embodiments, the notebook computer includes one or more temperatures sensors indicated at 155 and 160 to detect one or more of an internal temperature of the notebook computer, the battery temperature, and external temperature. The temperature sensors may be positioned proximate to the temperatures desired to be sensed, such as on or closely adjacent to the battery 135, in airflow paths of the cooling scheme for the notebook computer, or near air intake apertures to sense external or ambient temperature. The charging circuitry 130 either contains logic, or is controlled by system logic 125 in various embodiments to control a battery charge rate as a function of temperature. As ambient and internal temperatures rise, the charge rate is reduced or even halted until the temperatures reduce. In one embodiment, temperature profiles and corresponding charge rates may be determined empirically, and may vary depending on battery type, notebook computer operating parameters, and heat exchange capabilities. An altimeter 165 may also be included in the notebook computer 100 in some embodiments. The altimeter 165 detects the barometric pressure, which varies mostly as a function of altitude of the notebook computer 100, and controls the charge rate as a function of the pressure. Charge rates for various altitudes may also be determined empirically in some embodiments. In further embodiments, charging rate can also be a function of system power demand. If the system needs more power, we can choose to divert charging power to the system or vice versa.

Figure 2:
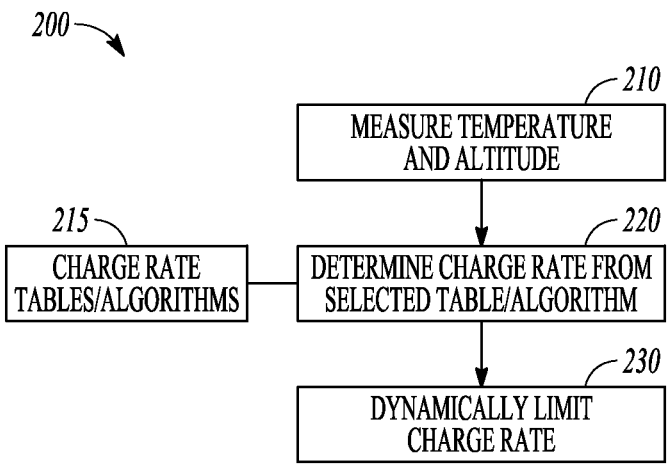
FIG. 2 is a flowchart illustrating a method of selecting a battery charge current according to an example embodiment.

FIG. 2 is a flowchart illustrating a method 200 of controlling the charge rate. In one embodiment, temperature and altitude of the battery is determined at 210. A fast charge temperature and altitude range may be defined in software as algorithms or look-up tables 215. At 220 the determined temperatures and altitude are used to determine an appropriate charge rate utilizing the algorithms or look-up tables 215.

In some embodiments, one or more temperatures may be used to determine an appropriate charge rate. The temperatures may include internal and external temperatures that help determine whether or not the battery will exceed desired temperatures at certain charge rates. For instance, if the external temperature is cool, significant cooling of the battery may be available such that the battery can be charged at a higher rate. The tables may include charging rates for multiple combinations of temperatures and altitude, as the altitude can also affect cooling efficiency. The charging current is selected from a table indexed by temperature and barometric pressure. The charging rates may be determined empirically in various embodiments, as they may be dependent on cooling capacities of different notebook computer designs and battery types. For example, Li-ion cells can accept higher charge currents, but may also result in significant heat generation.

In some embodiments, the table may be selected from a group of tables as a function of various power utilization and charging profiles to optimize charge rates. For example, one table may have charge rates for different temperatures and altitudes for a low power profile of operation of the notebook computer 100. A further table may contain charge rates for different temperatures and altitudes for an optimized performance mode or power profile of the notebook computer 100. The charge current is dynamically limited in one embodiment as a function of aging of the battery at 230. As battery cells age and overall battery capacity drops, the charge rate is also controlled to drop proportionally in one embodiment. If the charge rate were kept high, the battery cell degradation rate would increase.

Various embodiments allow a notebook computer or other apparatus to manage thermal, system performance and battery charge time. In performance versus charge time modes of operation, a setting in software allows a user to select to prioritize one over the other. The notebook will dynamically adjust both parameters depending on how much power is available at any time. In other words, the notebook computer will select a power profile and associated tables or algorithms for charge current determination as a function of user set priorities. If the user wishes to charge a battery faster, a lower power profile will allow for faster charging of the battery. If the user desires higher performance and does not need the battery recharged quickly, the user may select a higher performance mode, during which the battery may be charged with a lower current. In either case, the charge current will also be at least a function of temperature and optionally barometric pressure.

Figure 3:
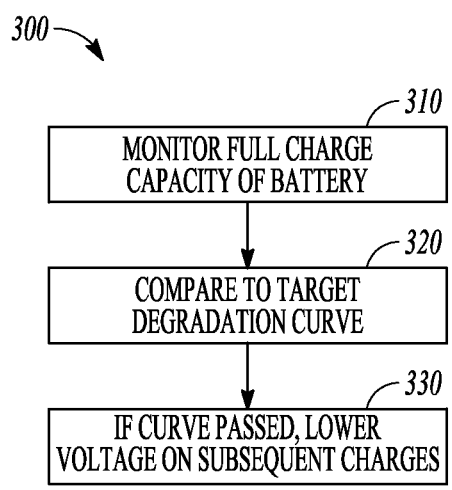
FIG. 3 is a flowchart illustrating a method of controlling battery charge current as a function battery degradation according to an example embodiment.

In further embodiments, it is desirable to monitor full charge capacity of the battery pack against expected capacity degradation. FIG. 3 is a flowchart of a method 300 of modifying the charging current for battery capacity degradation. At 310, the charging circuitry 130 monitors a full charge capacity of the battery 135. If the full charge capacity, over time, crosses over a target degradation curve as determined at 320, then the battery controller should charge the cells to a lower voltage on subsequent charge cycles at 330. This control methodology may significantly reduce the rate of cell degradation over time.

Figure 4:
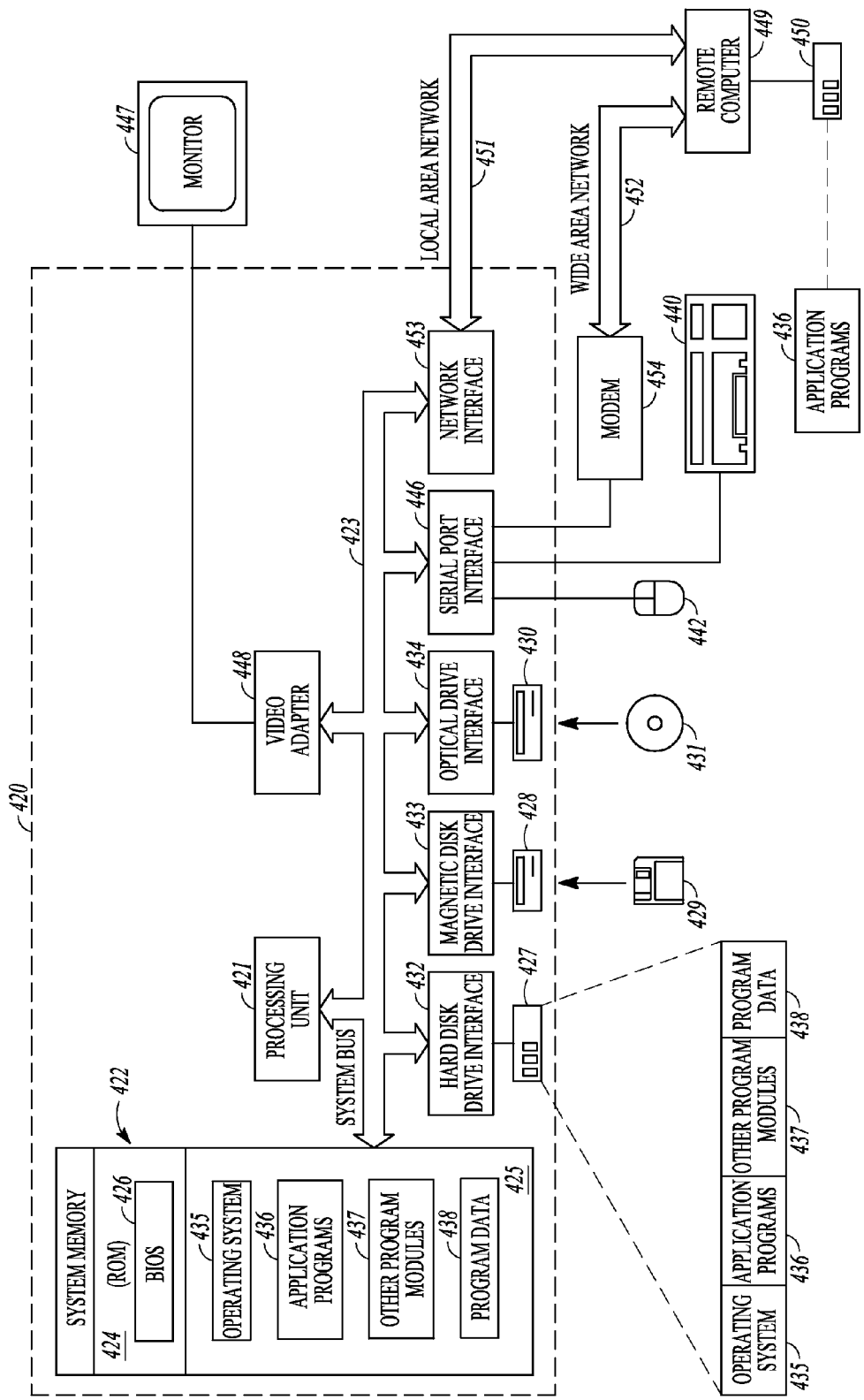
FIG. 4 is a block diagram of an information handling system according to an example embodiment.

FIG. 4 is a block diagram of a computer system to implement methods according to an example embodiment. In the embodiment shown in FIG. 4, a hardware and operating environment is provided.

As shown in FIG. 4 one embodiment of the hardware and operating environment includes a general purpose computing device in the form of a information handing device such as a computer 400 (e.g., a personal computer, notebook computer, workstation, server, slate, mobile phone, pad, server, and others), including one or more processing units 421, a system memory 422, and a system bus 423 that operatively couples various system components including the system memory 422 to the processing unit 421. There may be only one or there may be more than one processing unit 421, such that the processor of computer 400 comprises a single central-processing unit (CPU), or a plurality of processing units, commonly referred to as a multiprocessor or parallel-processor environment. In various embodiments, computer 400 is a conventional computer, a distributed computer, or any other type of computer.

The system bus 423 can be any of several types of bus structures including a memory bus or memory controller, a peripheral bus, and a local bus using any of a variety of bus architectures. The system memory can also be referred to as simply the memory, and, in some embodiments, includes read-only memory (ROM) 424 and random-access memory (RAM) 425. A basic input/output system (BIOS) program 426, containing the basic routines that help to transfer information between elements within the computer 400, such as during start-up, may be stored in ROM 424. The computer 400 further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM or other optical media.

The hard disk drive 427, magnetic disk drive 428, and optical disk drive 430 couple with a hard disk drive interface 432, a magnetic disk drive interface 433, and an optical disk drive interface 434, respectively. The drives and their associated computer-readable media provide non volatile storage of computer-readable instructions, data structures, program modules and other data for the computer 400. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 429, optical disk 431, ROM 424, or RAM 425, including an operating system 435, one or more application programs 436, other program modules 437, and program data 438. Programming for implementing one or more processes or method described herein may be resident on any one or number of these computer-readable media.

A user may enter commands and information into computer 400 through input devices such as a keyboard 440 and pointing device 442. Other input devices (not shown) can include a microphone, joystick, game pad, satellite dish, scanner, or the like. These other input devices are often connected to the processing unit 421 through a serial port interface 446 that is coupled to the system bus 423, but can be connected by other interfaces, such as a parallel port, game port, or a universal serial bus (USB). A monitor 447 or other type of display device can also be connected to the system bus 423 via an interface, such as a video adapter 448. The monitor 447 can display a graphical user interface for the user. In addition to the monitor 447, computers typically include other peripheral output devices (not shown), such as speakers and printers.

The computer 400 may operate in a networked environment using logical connections to one or more remote computers or servers, such as remote computer 449. These logical connections are achieved by a communication device coupled to or a part of the computer 400; the invention is not limited to a particular type of communications device. The remote computer 449 can be another computer, a server, a router, a network PC, a client, a peer device or other common network node, and typically includes many or all of the elements described above 110 relative to the computer 400, although only a memory storage device 450 has been illustrated. The logical connections depicted in FIG. 4 include a local area network (LAN) 451 and/or a wide area network (WAN) 452. Such networking environments are commonplace in office networks, enterprise-wide computer networks, intranets and the internet, which are all types of networks.

When used in a LAN-networking environment, the computer 400 is connected to the LAN 451 through a network interface or adapter 453, which is one type of communications device. In some embodiments, when used in a WAN-networking environment, the computer 400 typically includes a modem 454 (another type of communications device) or any other type of communications device, e.g., a wireless transceiver, for establishing communications over the wide-area network 452, such as the internet. The modem 454, which may be internal or external, is connected to the system bus 423 via the serial port interface 446. In a networked environment, program modules depicted relative to the computer 400 can be stored in the remote memory storage device 450 of remote computer, or server 449. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. An apparatus comprising:
   an AC adapter input;
   a battery charger coupled to the input to charge a battery;
   a temperature sensor;
   system logic to execute code stored on storage devices:
   wherein the battery charger provides a charging current that is a function of temperature sensed by the temperature sensor; and
   an altimeter to sense barometric pressure in the apparatus and wherein the battery charger further provides a charging current that is a function of the sensed barometric pressure.

2. The apparatus of claim 1 wherein the charging current is a further function of changing capacity of a battery to be charged.

3. The apparatus of claim 2 wherein the capacity of the battery to be charged is a function of actual capacity degradation as compared to a capacity degradation threshold.

4. The apparatus of claim 3 wherein a charging voltage is lower for subsequent recharging of the battery when the threshold is passed.

5. The apparatus of claim 1 and further comprising a diode coupled between the adapter input and the battery charger to allow current to flow to the main battery charger and to the system logic.

6. The apparatus of claim 1 and further comprising a diode coupled between the battery charger and the system logic to allow current to flow from the battery charger to the system logic.

7. The apparatus of claim 1 wherein the charging current is a function of a power profile of the apparatus.

8. The apparatus of claim 1 wherein the battery charge rate is dynamically limited as a function of age of the battery.

9. An apparatus comprising:
   an AC adapter input;
   a battery charger coupled to the input to charge a battery;
   a battery;
   a temperature sensor;
   an altimeter to sense barometric pressure in the apparatus;
   system logic to execute code stored on storage devices; and
   wherein the battery charger provides a charging current that is a function of temperature sensed by the temperature sensor and is a function of the sensed barometric pressure.

10. The apparatus of claim 9 wherein the charging current is selected from a table indexed by temperature and barometric pressure, and wherein the table is selected from a group of tables as a function of a power profile of the apparatus.

11. The apparatus of claim 9 wherein the charging current is a further function of changing capacity of a battery to be charged and wherein the capacity of the battery to be charged is a function of actual capacity degradation as compared to a capacity degradation threshold.

12. The apparatus of claim 11 wherein a charging voltage is lower for subsequent recharging of the battery when the threshold is passed.

13. The apparatus of claim 9 wherein the battery charge rate is dynamically limited as a function of age of the battery.

14. A method comprising:
   detecting a temperature of an apparatus;
   detecting a barometric pressure of the apparatus; and
   charging an apparatus battery with a charging current selected as a function of the detected temperature and barometric pressure of the apparatus.

15. The method of claim 14 wherein the charging current is a further function of the age of the battery, and the charging current is reduced with increasing age of the battery.

16. The method of claim 15 wherein the charging current is a further function of a power profile of the apparatus.

17. The method of claim 16 wherein the charging current is a further function of a full charge capacity of the battery.

18. The method of claim 17 wherein the full charge capacity of the battery is compared to an expected degradation curve, and wherein the charging voltage is reduced for subsequent charging of the battery when the curve is crossed.

19. The method of claim 14 and further comprising detecting an ambient temperature and wherein the charging current is a further function of the detected ambient temperature.

* * * * *